United States Patent
Phillips et al.

(10) Patent No.: US 6,789,062 B1
(45) Date of Patent: Sep. 7, 2004

(54) AUTOMATICALLY RETRAINING A SPEECH RECOGNITION SYSTEM

(75) Inventors: Michael S. Phillips, Belmont, MA (US); Krishna K. Govindarajan, Somerville, MA (US); Mark Fanty, Norfolk, MA (US); Etienne Barnard, Somerville, MA (US)

(73) Assignee: SpeechWorks International, Inc., Boston, MA (US)

( * ) Notice: Subject to any disclaimer, the term of this patent is extended or adjusted under 35 U.S.C. 154(b) by 0 days.

(21) Appl. No.: 09/512,785

(22) Filed: Feb. 25, 2000

(51) Int. Cl.[7] ............................................. G01L 15/06
(52) U.S. Cl. ...................... 704/250; 704/231; 704/270
(58) Field of Search ............................... 704/231, 236, 704/247, 251, 250, 252, 255, 240, 256, 257, 270, 243

(56) References Cited

U.S. PATENT DOCUMENTS

| | | | | |
|---|---|---|---|---|
| 5,737,487 A | * | 4/1998 | Bellegarda et al. | 704/250 |
| 5,799,276 A | * | 8/1998 | Komissarchik et al. | 704/251 |
| 5,812,972 A | * | 9/1998 | Juang et al. | 704/234 |
| 5,864,810 A | * | 1/1999 | Digalakis et al. | 704/255 |
| 5,893,059 A | * | 4/1999 | Raman | 704/256 |
| 5,960,394 A | * | 9/1999 | Gould et al. | 704/240 |
| 6,014,624 A | * | 1/2000 | Raman | 704/243 |
| 6,070,136 A | * | 5/2000 | Cong et al. | 704/222 |
| 6,073,097 A | * | 6/2000 | Gould et al. | 704/251 |
| 6,101,468 A | * | 8/2000 | Gould et al. | 704/251 |
| 6,134,527 A | * | 10/2000 | Meunier et al. | 704/247 |

* cited by examiner

Primary Examiner—Susan McFadden
(74) Attorney, Agent, or Firm—Fish & Richardson P.C.

(57) ABSTRACT

A telephone-based interactive speech recognition system is retrained using variable weighting and incremental retraining. Variable weighting involves changing the relative influence of particular measurement data to be reflected in a statistical model. Statistical model data is determined based upon an initial set of measurement data determined from an initial set of speech utterances. When new statistical model data is to be generated to reflect new measurement data determined from new speech utterances, a weighting factor is applied to the new measurement data to generate weighted new measurement data. The new statistical model data is then determined based upon the initial set of measurement data and the weighted new measurement data. Incremental retraining involves generating new statistical model data using prior statistical model data to reduce the amount of prior measurement data that must be maintained and processed. When prior statistical model data needs to be updated to reflect characteristics and attributes of new speech utterances, statistical model data is generated for the new speech utterances. Then the prior statistical model data and the statistical model data for the new measurement data are processed to generate the new statistical model data.

32 Claims, 6 Drawing Sheets

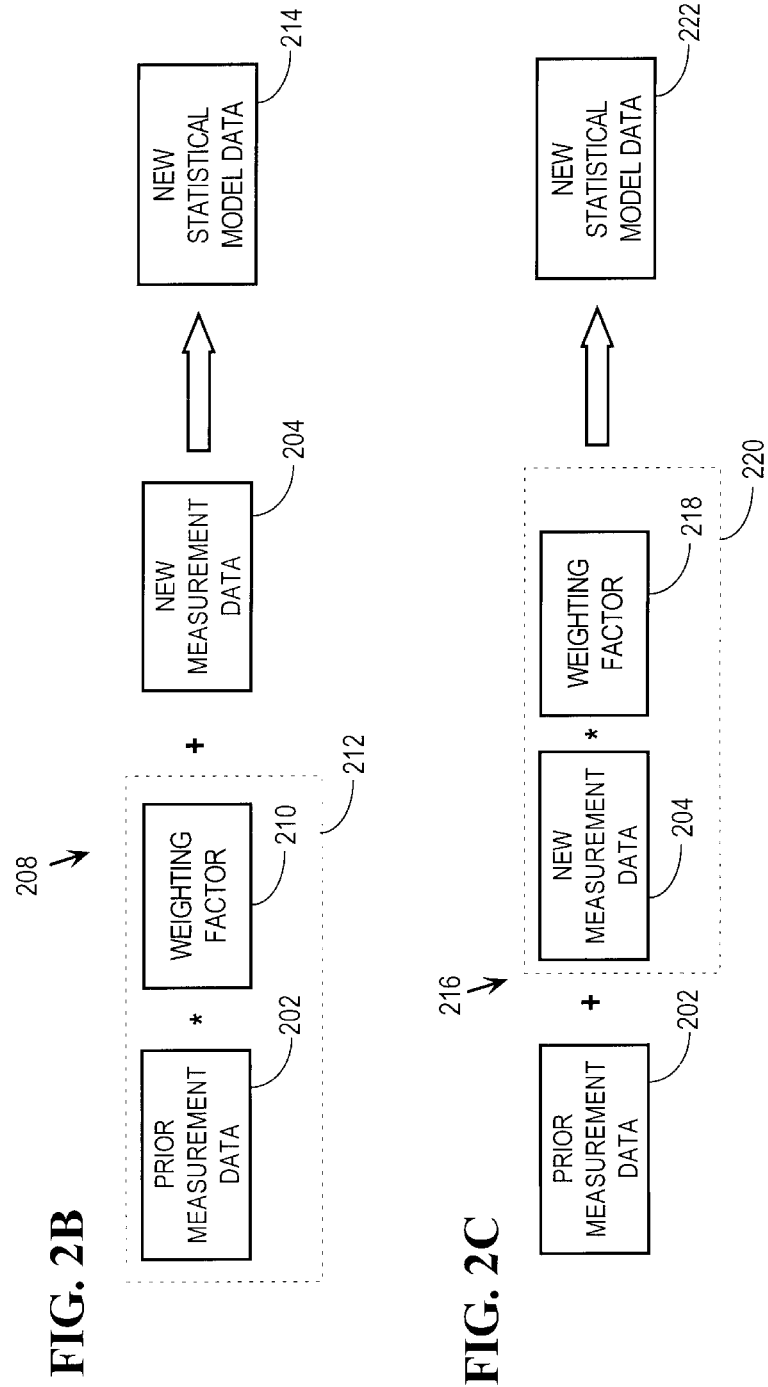

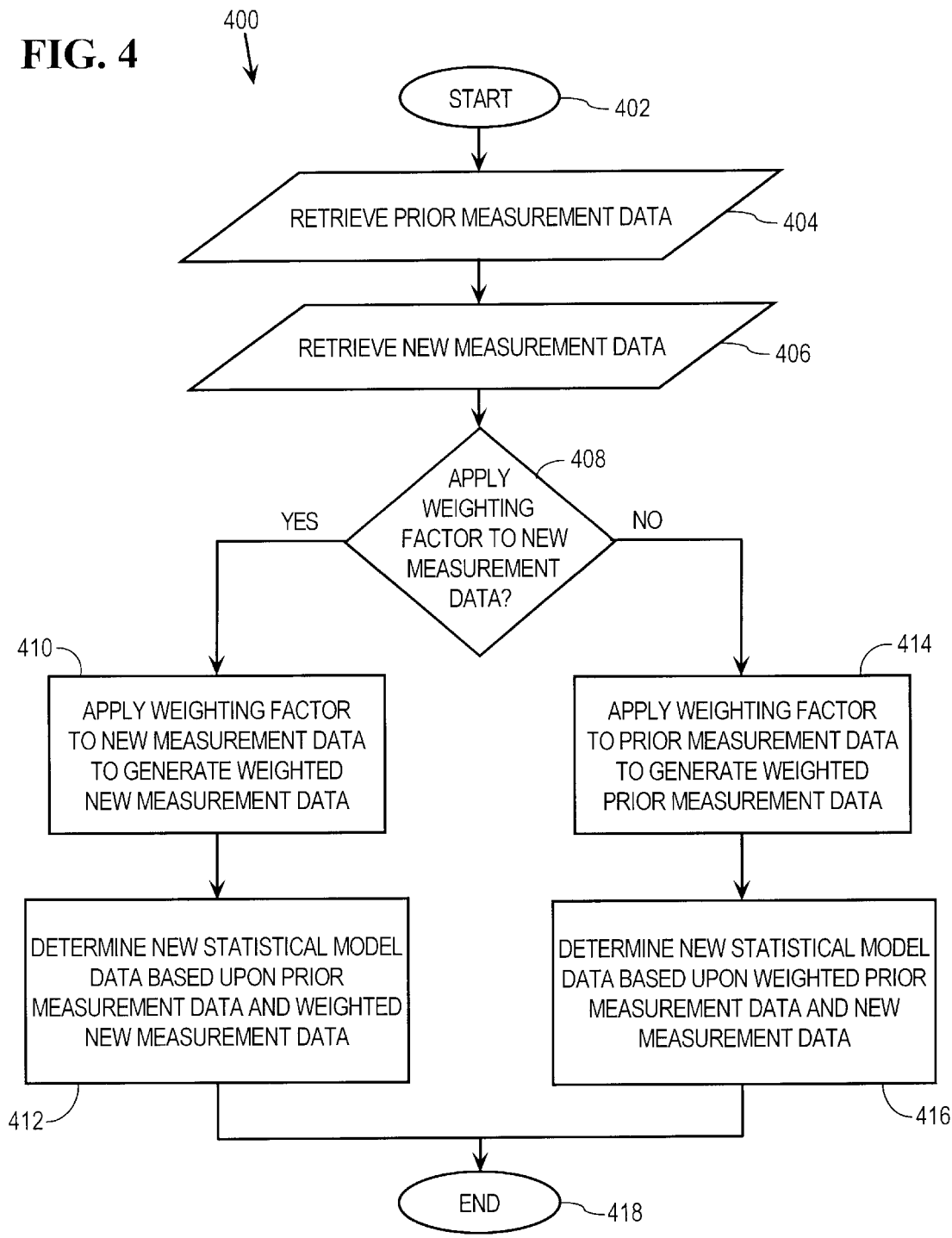

AUTOMATICALLY RETRAINING A SPEECH RECOGNITION SYSTEM

FIELD OF THE INVENTION

The invention relates generally to speech recognition systems, and relates more specifically to an approach for automatically retraining a speech recognition system.

BACKGROUND OF THE INVENTION

Most speech recognition systems are "trained" for specific applications or contexts. Training a speech recognition system generally involves generating a statistical model for a sample set of speech utterances that are representative of a specific application or context. The sample set of speech utterances is typically referred to as a "training set." Generating a statistical model for a training set involves two fundamental steps. First, measurements are performed on the training set to generate a body of measurement data for the training set that specifies attributes and characteristics of the training set. Some training sets require a large amount of measurement data because of the number and character of speech utterances contained in the training set. Furthermore, a large amount of measurement data is often desirable since the accuracy of statistical models generally increases as the amount of measurement data increases. Human review and confirmation of measurement results is often employed to improve the accuracy of the measurement data, which can be very labor intensive and can take a long time.

Once the measurement data has been generated, statistical analysis is performed on the measurement data to generate statistical model data that defines a statistical model for the measurement data. The statistical model is a multi-dimensional mathematical representation derived from the training set.

Once a statistical model has been generated, a received speech utterance is evaluated against the statistical model in an attempt to match the received speech utterance to a speech utterance from the training set. Sometimes separate statistical models are used for different applications and contexts to improve accuracy.

Statistical models periodically require retraining to account for changes in the applications or contexts for which the statistical models were originally determined. For example, a particular application may use new words or subjects that are not represented in the statistical model for the particular application. As a result, the statistical model may not provide a high level of accuracy with respect to the new words or subjects. Retraining allows the statistical model to reflect the new words or subjects.

Conventional retraining is usually performed in a manual, offline process by supplementing the training data with the new words or subjects and then rebuilding the statistical model from the supplemented training data. One problem with this approach is that manual retraining can be very labor intensive (requiring substantial human supervision) and take a long time to implement. This means that statistical models cannot be quickly updated to recognize changes in utterances. Another problem with conventional retraining techniques is that the amount of measurement data that must be maintained continues to grow over time as the number and size of training sets increases. As a result, the measurement data requires an ever increasing amount of system resources, e.g., non-volatile storage such as disks, to store the data. For speech recognition systems requiring a large number of statistical models, e.g., for different applications, different users, or different subject matter, the amount of measurement data can be enormous.

Yet another problem with conventional retraining approaches is that new measurement data is often not adequately represented in statistical models. This occurs, for example, during retraining when a relatively small amount of new measurement data is processed with a relatively larger amount of prior measurement data to generate new statistical model data. The relatively larger amount of prior measurement data tends to dilute the effect of the relatively smaller amount of new measurement data. As a result, speech utterances associated with the new measurement data may not be adequately represented in the new statistical model data, resulting in a lower level of accuracy.

Based on the foregoing, there is a need for an approach for retraining speech recognition systems that avoids the limitations in the prior approaches.

There is a particular need for a computer-implemented approach for automatically retraining a speech recognition system that requires a reduced amount of human supervision. There is also a need for an approach for retraining a speech recognition system that reduces the amount of prior measurement data that must be maintained.

There is a further need for a retraining approach that addresses the problem of new measurement data dilution.

SUMMARY OF THE INVENTION

The foregoing needs, and other needs and objects that will become apparent from the following description, are achieved by the present invention, which comprises, in one aspect, a method for automatically retraining a speech recognition system. According to the method, prior measurement data that was determined for a prior set of speech utterances is retrieved. New measurement data is determined for a new set of speech utterances. A weighting factor is applied to the new measurement data to generate weighted new measurement data. New statistical model data is generated using the prior measurement data and the weighted new measurement data.

According to another aspect, a method is provided for automatically retraining a speech recognition system. Prior measurement data that was determined for a prior set of speech utterances is retrieved. New measurement data is determined for a new set of speech utterances. A weighting factor is applied to the prior measurement data to generate weighted prior measurement data. New statistical model data is generated using the weighted prior measurement data and the new measurement data.

According to another aspect, a method is provided for automatically retraining a speech recognition system. A first set of speech utterances is retrieved. Then, first measurement data is determined for the first set of speech utterances. First statistical model data is determined based upon the first measurement data. A statistical model is determined based upon the first statistical model data. A second set of speech utterances is retrieved. Second measurement data is determined for the second set of speech utterances. Second statistical model data is determined based upon the second measurement data. Finally, an updated statistical model is determined using the first statistical model data and the second statistical model data and without using either the first measurement data or the second measurement data.

According to another aspect a speech recognition system comprises a storage medium and a retraining mechanism communicatively coupled to the storage medium. The retraining mechanism is configured to retrieve prior measurement data determined for a prior set of speech utterances from the storage medium. The retraining mechanism is also configured to determine new measurement data for a new set of speech utterances. The retraining mechanism is further configured to apply a weighting factor to the new measurement data to generate weighted new measurement data. The retraining mechanism is configured to generate new statistical model data using the prior measurement data and the weighted new measurement data.

BRIEF DESCRIPTION OF THE DRAWINGS

Embodiments are illustrated by way of example, and not by way of limitation, in the figures of the accompanying drawings in which like reference numerals refer to similar elements and in which:

FIG. 2A is a flow diagram of a conventional approach for retraining a speech recognition system.

FIG. 2B is a flow diagram of a process of performing retraining using variable weighting according to an embodiment.

FIG. 2C is a flow diagram of a process of performing retraining using variable weighting according to another embodiment.

FIG. 4 is a flow diagram of a process for retraining a speech recognition system using variable weighting.

DETAILED DESCRIPTION OF THE PREFERRED EMBODIMENT

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Various aspects and features of example embodiments are described in more detail in the following sections: (1) introduction; (2) system overview; (3) retraining using variable weighting; (4) incremental retraining; and (5) implementation mechanisms.

1. Introduction

An approach for automatically retraining a speech recognition system is described. In general, variable weighting is used to change the relative influence of new measurement data on statistical model data. In addition, an incremental retraining approach is employed to reduce the amount of prior measurement data that must be maintained and processed by reusing prior statistical model data. Incremental retraining may also be implemented in combination with variable weighting.

2. System Overview

Figure 1:
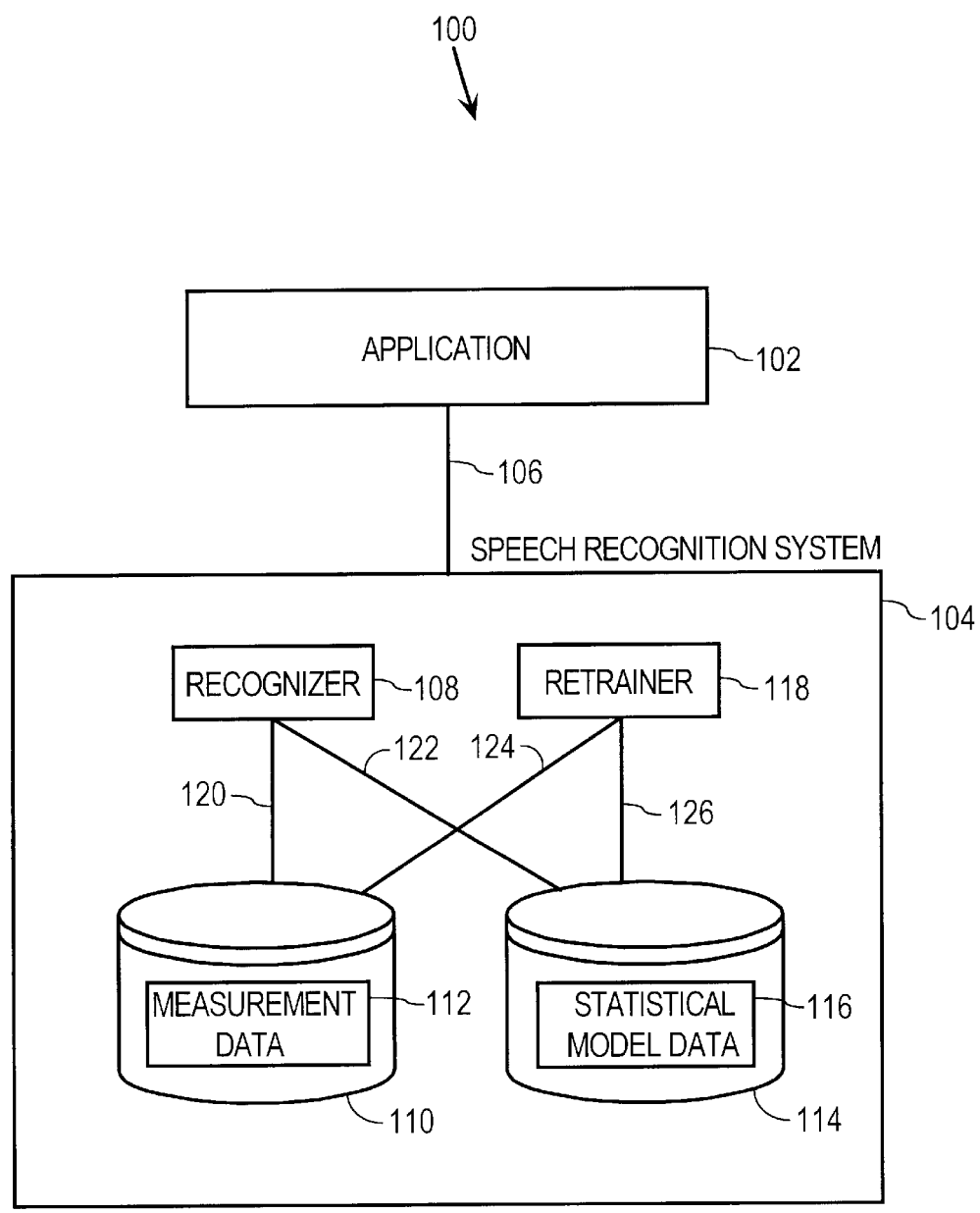
FIG. 1 is a block diagram of a system for retraining a speech recognition system according to an embodiment.

FIG. 1 illustrates a system 100 used herein to describe various aspects and features of the invention. System 100 includes an application 102 that interacts with a speech recognition system (SRS) 104. Application 102 is any entity that uses the speech recognition services of SRS 104. Examples of application 102 include, but are not limited to, a voice-activated system or a telephone-based service. Application 102 is communicatively coupled to SRS 104 via a link 106.

SRS 104 includes a recognizer 108, a non-volatile storage 110, such as one or more disks, containing measurement data 112, a non-volatile storage 114, containing statistical model data 116 and a retrainer 118. Recognizer 108 is communicatively coupled to non-volatile storage 110 via link 120. Recognizer 108 is communicatively coupled to non-volatile storage 114 via link 122. Retrainer 118 is communicatively coupled to non-volatile storage 110 via link 124. Retrainer 118 is communicatively coupled to non-volatile storage 114 via link 126. Links 106, 120, 122, 124 and 126 may be implemented using any mechanism to provide for the exchange of data between their respective connected entities. Examples of links 106, 120, 122, 124 and 126 include, but are not limited to, network connections, wires, fiber-optic links and wireless communications links.

Recognizer 108 is a mechanism that is configured to analyze and match received speech utterances to known speech utterances based upon statistical model data 116. Statistical model data 116 defines characteristics or attributes of known speech utterances. Statistical model data 116 is generated by performing one or more statistical analyses of measurement data 112 that is obtained from measurements performed on known speech utterances. To analyze received speech utterances, characteristics of the received speech utterances are determined and compared to the statistical model data 116 to determine specific known speech utterances that match the received speech utterances. Recognizer 108 may be implemented as any type of recognizer and embodiments are not limited to a particular type of recognizer.

According to an embodiment of the invention, retrainer 118 provides automatic retraining of SRS 104. Specifically, retrainer 118 automatically updates statistical model data 116 to reflect changes made to measurement data 112 according to the variable weighting and incremental retraining approaches described in more detail herein. Changes to measurement data 112 may include changes to existing data contained in measurement data 112 or may include new data added to measurement data 112. According to one embodiment, retrainer 118 may select a subset of measurement data 112 for updating statistical model data 116 based upon a set of measurement data selection criteria. This subset consists of those utterances which are likely to have been recognized correctly by recognizer 108, and therefore the output of recognizer 108 may be used for training instead of a manual transcription.

The invention is not limited to any particular measurement data selection criteria and may include, for example, confidence scores or measurements, confirmation data, or any other data that is useful in selecting a subset of measurement data 112 for retraining. The selection of a subset of measurement data 112 for retraining may also be performed external to retrainer 118, for example by a separate filtering mechanism, or by recognizer 108.

SRS 104 may include other components not illustrated and described herein so as to not obscure the various aspects and features of the invention. For example, SRS 104 may include various software development tools and application testing tools available to aid in the development process. One such tool is a commercially-available package of reusable software modules known as DialogModules™, provided by Speechworks International, Inc. of Boston, Mass.

3. Retraining Using Variable Weighting

According to one embodiment, an approach referred to herein as "variable weighting" is used during retraining to change the relative influence of particular measurement data to be reflected in a statistical model. For purposes of explanation, the variable weighting approach is described in the context of building new statistical measurement model data based upon both prior measurement data and new measurement data. As used herein, the term "prior measurement data" refers to measurement data determined from measurements performed on a prior set of speech utterances and upon which a current statistical model data is based. Furthermore, as used herein, the term "new measurement data" refers to measurement data determined from measurements performed on a new set of speech utterances which, when combined with prior measurement data, is used to determine the new statistical model data.

The variable weighting approach allows statistical model data to reflect recent changes in measurement data, while compensating for differences in the amount of new measurement data compared to prior measurement data. For example, in some situations, the amount of data in prior measurement data may be many times the amount of data in new measurement data. In these situations, when the prior measurement data and the new measurement data are combined and then analyzed to determine new statistical model data, the effect of the new measurement data may be diluted by the prior measurement data. As a result, speech utterances represented by the new measurement data may not be adequately represented in the new statistical model data. This under-representation can result in reduced accuracy for the new speech utterances.

Variable weighting may be applied to any data to be reflected in a statistical model and the invention is not limited to applying variable weighting to any particular data. For example, variable weighting may be applied to either prior measurement data or new measurement data. When applied to the prior measurement data, variable weighting has the effect of changing the influence of prior measurement data relative to new measurement data. When applied to new measurement data, variable weighting has the effect of changing the relative influence of the new measurement data relative to prior measurement data.

The variable weighting approach for retraining statistical model data is now described with reference to FIGS. 2A–2C. FIG. 2A is a flow diagram 200 that illustrates a conventional retraining approach for updating statistical model data in a speech recognition system. Prior measurement data 202 and new measurement data 204 are combined and processed using statistical analysis to generate new statistical model data 206. New statistical model data 206 defines attributes and characteristics of speech utterances that prior measurement data 202 and new measurement data 204 are based upon. It should be noted that the "+" symbol used in FIGS. 2A–2C is used to represent any type of combining and is not limited to a simple addition.

FIG. 2B is a flow diagram 208 that illustrates an approach for retraining a speech recognition system using variable weighting according to an embodiment. Prior measurement data 202 is first weighted using a weighting factor 210 to generate weighted prior measurement data 212. Weighting factor 210 may cause prior measurement data 202 to have a relatively lesser or a relatively greater influence on new statistical model data 214. Weighted prior measurement data 212 is then combined with new measurement data 204 and processed using statistical analysis to generate new statistical model data 214.

FIG. 2C is a flow diagram 216 that illustrates an approach for retraining a speech recognition system using variable weighting according to an embodiment. New measurement data 204 is weighted using a weighting factor 218 to generate weighted new measurement data 220. Weighting factor 218 may cause new measurement data 204 to have a relatively lesser or a relatively greater influence on new statistical model data 222. Weighted new measurement data 220 is then combined with prior measurement data 202 and processed using statistical analysis to generate new statistical model data 222.

Weighting factors 210, 218 may be the same or different and the approaches illustrated in FIGS. 2B and 2C may result in new statistical model data 214 being mathematically equivalent to new statistical model data 222. In addition, weighting factors 210, 218 may be constant, or may vary, linearly or non-linearly, depending upon specified weighting criteria. According to one embodiment, the weighting criteria specifies a constant. In this situation, weighting factors 210, 218 are constants applied to prior measurement data 202 and new measurement data 204, respectively, regardless of the amount of data contained in prior measurement data 202 and new measurement data 204.

Figure 3A:
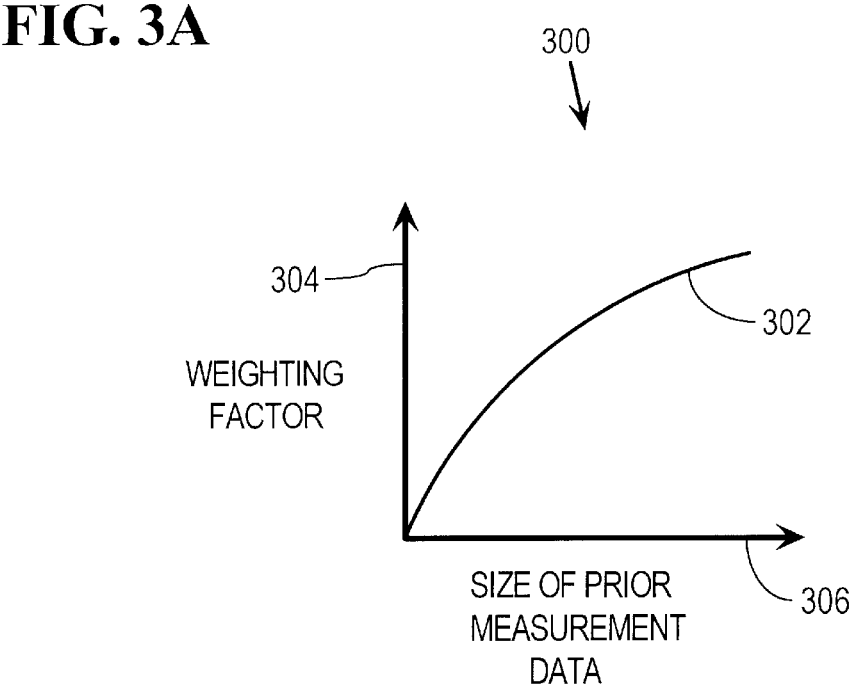
FIG. 3A is a graph illustrating a variable weighting factor determined according to an embodiment.

According to another embodiment, the weighting criteria accounts for the amount of data contained in prior measurement data 202 and new measurement data 204. For example, referring to a graph 300 of FIG. 3A, line 302 illustrates how the magnitude of weighting factor 218, represented by axis 304, varies with the amount of data contained in prior measurement data 202, represented by axis 306. Specifically, weighting factor 218 increases (non-linearly) as the amount of data in prior measurement data 202 increases. This approach increases the relative influence of new measurement data 204 on new statistical model data 222 as the amount of data in prior measurement data 202 increases.

Figure 3B:
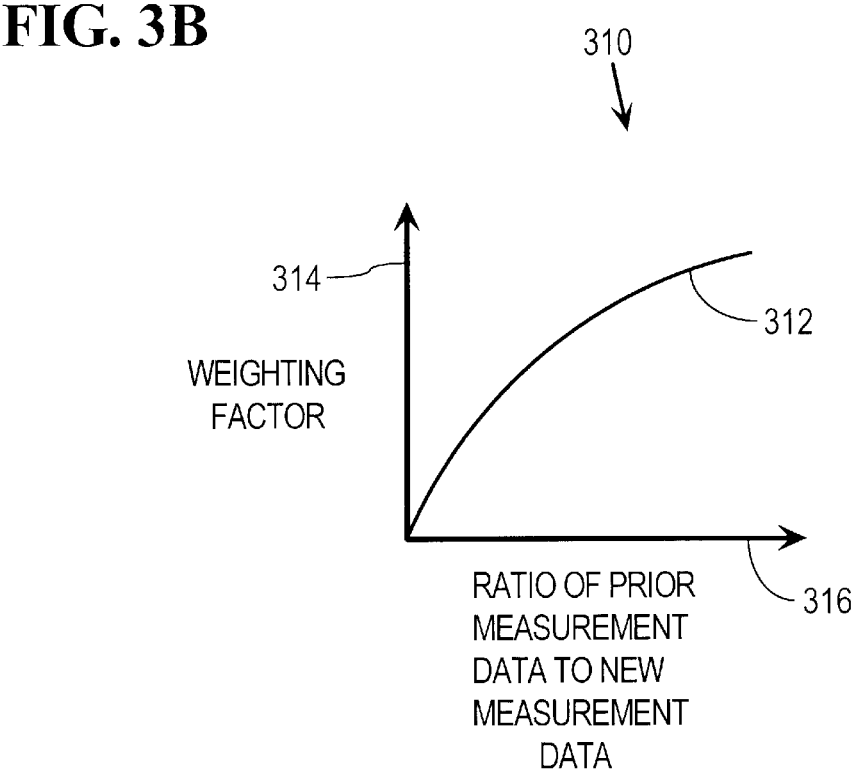
FIG. 3B is a graph illustrating a variable weighting factor determined according to another embodiment.

According to another embodiment, weighting criteria accounts for a ratio of the amount of data in prior measurement data 202 to the amount of data in new measurement data 204, respectively. For example, referring to a graph 310 of FIG. 3B, line 312 illustrates how the magnitude of weighting factor 218, represented by axis 314, varies with the ratio of the amount of data in prior measurement data 202 to the amount of data in new measurement data 204, represented by axis 316. According to this approach, weighting factor 218 increases as the ratio of data in prior measurement data 202 to data in new measurement data 204 increases to compensate for a relatively larger amount of prior measurement data 202.

Many other types of weighting criteria may be used. For example, the weighting criteria may specify certain weighting factors for certain subjects. Thus, if the new set of speech utterances relates to subject A, then weighting factor A is applied. If the new set of speech utterances relates to subject B, then weighting factor B is applied. This is particularly useful, for example, when new speech utterances that pertain to particular subjects are known to be more or less susceptible to statistical dilution.

FIG. 4 is a flow diagram 400 that illustrates an approach for retraining a speech recognition system using variable weighting according to an embodiment. After starting in step 402, in step 404, prior measurement data 202 is retrieved. In step 406, new measurement data is retrieved 204. Prior measurement data 202 and new measurement data 204 are typically retrieved from non-volatile storage such as a disk.

In step 408, a determination is made whether weighting factor 210, 218 is to be applied to new measurement data 204. If so, then in step 410, weighting factor 218, as determined by specified weighting criteria, is applied to new measurement data 204 to generate weighted new measurement data 220. Then, in step 412, new statistical model data 222 is determined based upon prior measurement data 202 and weighted new measurement data 220.

If in step 408, a determination is made that weighting factor 210, 218 is not to be applied to new measurement data 204, then in step 414, weighting factor 210 is applied to prior measurement data 202 to generate weighted prior measurement data 212. Then, in step 416, new statistical model data 214 is determined based upon weighted prior measurement data 212 and new measurement data 204. The process is then complete in step 418. As previously described herein, the weighting factor may be applied to either prior measurement data or new measurement data depending upon the requirements of a particular application and may be mathematically equivalent depending upon the weighting factors used.

4. Incremental Retraining

In general, incremental retraining is an approach for retraining a speech recognition system by updating a statistical model using prior statistical model data to reduce the amount of prior measurement data and prior speech utterance data that must be maintained and processed. According to one embodiment, when a statistical model needs to be updated to reflect characteristics and attributes of new speech utterances, measurements are performed on the new speech utterances to generate new measurement data. New statistical model data is then generated from the new measurement data by performing statistical analysis only on the new measurement data. Then the prior statistical model data and the new statistical model data are processed together to generate the new statistical model. At this point, the new speech utterance data, i.e., the waveform data for the new speech utterances, is not needed and may be discarded.

This approach differs substantially from conventional retraining approaches that combine prior speech utterances with the new speech utterances, generate measurement data for the combined speech utterances and then perform statistical analysis on all of the measurement data to generate new statistical model data. Incremental retraining may be used with any type of statistical model data and embodiments of the invention are not limited to any particular type of statistical model data.

As an example of incremental training, suppose that measurements are performed on an initial set of speech utterances. Specifically, N number of measurements are performed on a set of one or more initial speech utterances. Then, the mean and variance of the N number of measurements is determined for the set of one or more initial speech utterances as follows:

$$\text{Mean} = \frac{M1 + M2 + \ldots MN}{N}$$

$$\text{Variance} = \frac{(M1 - \text{Mean})^2 + (M2 - \text{Mean})^2 + \ldots (MN - \text{Mean})^2}{N}$$

The N number of measurements are then processed using statistical analysis to generate initial statistical model data for the set of one or more initial speech utterances. When a set of one or more new speech utterances is to be reflected in the statistical model, first N' number of measurements are performed on only the set of one or more new speech utterances to generate new measurement data. Then, statistical analysis is performed on the new measurement data to generate new statistical model data. A new statistical model is then generated from the initial statistical model data and the new statistical model data without having to repeat the measurements on the set of one or more initial speech utterances or repeat the statistical analysis on the initial measurement data. Thus, the initial speech utterances, i.e., the wave form data, and the initial measurement data, do not have to be maintained and can be discarded.

The incremental training approach is applicable to statistical models that include separate statistical data for each speech utterance that the statistical models are built upon. In addition, the incremental training approach is applicable to statistical models that include cumulative statistical data for each speech utterance that the statistical models are built upon. For this situation, the cumulative statistical data is updated to account for statistical results determined for new speech utterances.

Figure 5:
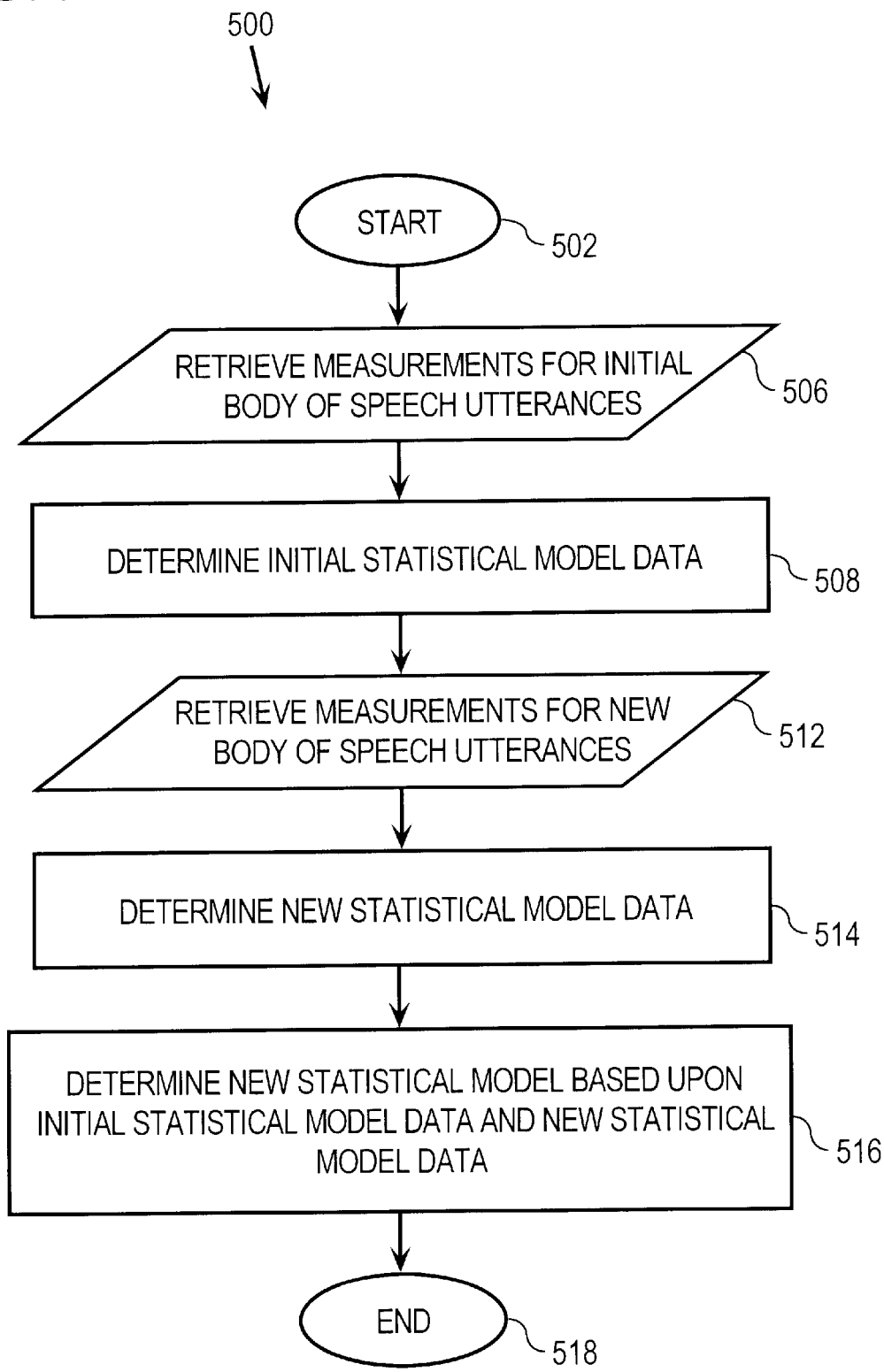
FIG. 5 is a flow diagram of a process for retraining a speech recognition system using incremental retraining.

FIG. 5 is a flow diagram 500 that illustrates an approach for retraining a speech recognition system using incremental retraining according to an embodiment. After starting in step 502, in step 506, measurements are retrieved for the initial body of speech utterances. In step 508, initial statistical model data is determined based upon the initial measurement data. In step 512, measurements are retrieved for the body of new speech utterances. In step 514, new statistical data is determined based upon the new measurement data. In step 516, a new statistical model is determined based upon both the initial statistical model data and the new statistical model data without having to remeasure the initial body of speech utterances or having to regenerate the initial statistical model data. Thus, the utterance data, i.e., the waveform data, does not have to be maintained and can be discarded. The process is complete in step 518.

Retraining of a speech recognition system may be performed using both the incremental retraining and variable weighting approaches described herein. Specifically, the relative influence of the initial statistical model data or the new statistical model data may be changed by applying a weighting factor thereto as previously described herein.

It should be noted that although various embodiments may have been described herein in the context of specific types of measurement data, the invention is not limited to any particular type of measurement data and may be used with any type of measurement data. Furthermore, although various embodiments may have been described herein in the context of specific statistical analysis data and processes, the invention is not limited to any particular statistical analysis data and processes and may be used with any statistical analysis data and processes.

5. Implementation Mechanisms

A. Overview

The approach described herein for automatically retraining a speech recognition system may be implemented in computer software, in hardware circuitry, or as a combination of computer software and hardware circuitry. Accordingly, the invention is not limited to a particular computer software or hardware circuitry implementation. For example, the approach may be implemented in retrainer 118 as part of speech recognition system 104. Alternatively, the approach may be implemented as part of recognizer 108. As another example, the approach may be implemented as a stand-alone mechanism that is periodically used to update statistical model data 116 to accurately reflect measurement data 112. The approach may be implemented with any type of speech recognition system, for example a telephone-based interactive speech recognition system.

B. Example Implementation Hardware

Figure 6:
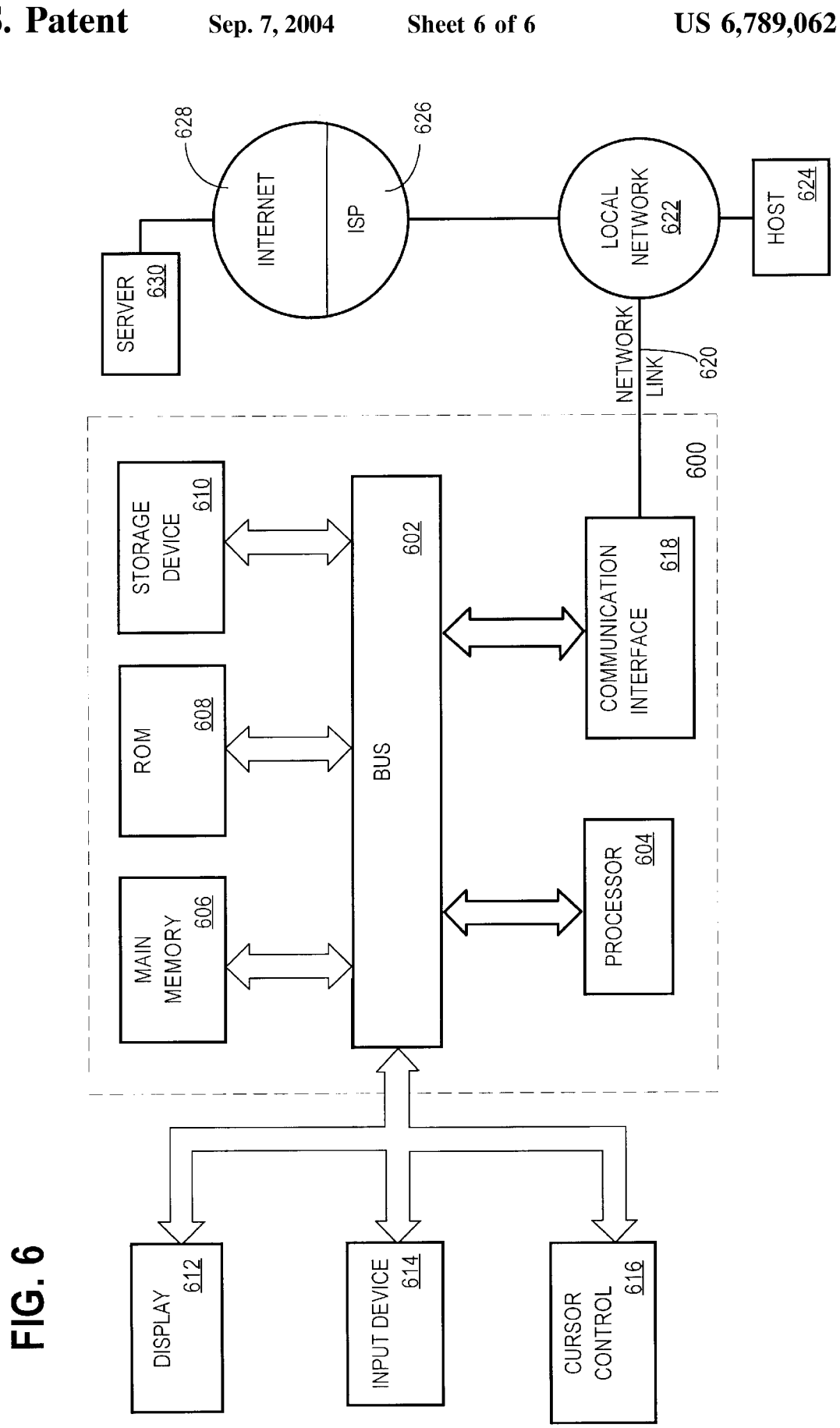
FIG. 6 is a block diagram of a computer system on which embodiments may be implemented.

FIG. 6 is a block diagram that illustrates an example computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for automatically retraining a speech recognition system. According to one embodiment of the invention, the retraining of a speech recognition system is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for automatically retraining a speech recognition system as described herein.

The received code may be executed by processor 604 as it is received, and/or stored in storage device 610, or other non-volatile storage for later execution. In this manner, computer system 600 may obtain application code in the form of a carrier wave.

The approach described in this document for automatically retraining a speech recognition system provides several advantages over prior retraining approaches. In particular, the computer-based implementation described herein reduces the amount of human resources, e.g., human supervision, required to retrain a speech recognition system. This provides the benefit of being able to quickly retrain a speech recognition system to recognize a new set of utterances or changes to existing utterances. Variable weighting allows the relative influence of particular measurement data to be changed, providing more flexible retraining, particularly when a small amount of new measurement data is to be included in a new statistical model. In addition, incremental training reduces the amount of prior utterance data, i.e., wave form data, and measurement data that must be maintained by using prior statistical data associated with the prior measurement data.

In the foregoing specification, particular embodiments have been described. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for automatically updating a statistical model for a speech recognition system comprising:

accepting data representing a plurality of individual prior speech utterances on which the statistical model is based;

accepting data representing one or more individual new speech utterances; and generating an updated statistical model for use by the speech recognition system to recognize speech utterances, including relatively weighting the data representing the plurality of individual prior speech utterances and the data representing the one or more individual new speech utterances according to a weighting factor.

2. A method as recited in claim 1, further comprising determining the weighting factor according to a desired relative influence on the updated statistical model of the plurality of individual prior speech utterances and the one or more individual new utterances.

3. A method as recited in claim 2, wherein determining the weighting factor includes determining the weighting factor based upon an amount of the data representing the plurality of individual prior speech utterances.

4. A method as recited in claim 2, wherein determining the weighting factor includes determining the weighting factor based upon a ratio of an amount of the data representing the plurality of individual prior speech utterances to an amount of the data representing the one or more individual new speech utterances.

5. A method as recited in claim 2, wherein determining the weighting factor includes determining a confidence that each of at least some of the one or the individual new speech utterances was correctly recognized.

6. A method as recited in claim 2, wherein determining the weighting factor includes determining whether a recognition result of each of at least some of the one or more individual new speech utterances was confirmed by a user.

7. A method as recited in claim 2, wherein determining the weighting factor includes using a subject matter of each of at least some of the one or more individual new speech utterances.

8. The method as recited in claim 2, wherein determining the weighting factor includes determining the weighting factor so that the desired relative influence of the one or more individual new utterances is greater than the influence of the plurality of prior speech utterances.

9. The method as recited in claim 2, wherein determining the weighting factor includes determining the weighting factor according to a topic of utterances in the one or more individual new speech utterances.

10. A method as recited in claim 1, wherein determining the weighting factor includes determining a confidence that each of at least some of the one or more individual new speech utterances was correctly recognized.

11. A method as recited in claim 1, wherein determining the weighting factor includes determining whether a recognition result of each of at least some of the one or more individual new speech utterances was confirmed by a user.

12. The method as recited in claim 1, wherein generating the updated statistical model includes weighting the data representing the plurality of prior speech utterances to produce prior weighted data, and combining the prior weighted data with the data representing the one or more individual new utterances.

13. The method of claim 1, further comprising using the updated statistical model to recognize speech utterances.

14. A computer-readable medium carrying one or more sequences of one or more instructions for automatically retraining a telephone-based interactive speech recognition system, the one or more sequences of one or more instructions including instructions which, when executed by one or more processors, cause the one or more processors to perform steps comprising:

selecting a portion of prior measurement data for a prior set of speech utterances based upon a set of measurement data selection criteria;

retrieving the portion of prior measurement data;

determining new measurement data for a new set of speech utterances;

applying a weighting factor to the new measurement data to generate weighted new measurement data; and generating new statistical model data for use by the telephone-based interactive speech recognition system, including using the portion of prior measurement data and the weighted new measurement data.

15. A computer-readable medium as recited in claim 14, further comprising instructions which, when executed by the one or more processors, cause the one or more processors to determine the weighting factor based upon one or more weighting criteria.

16. A computer-readable medium as recited in claim 15, wherein the one or more weighting criteria includes an amount of data contained in the portion of prior measurement data, and the step of determining the weighting factor based upon the one or more weighting criteria includes determining the weighting factor based upon an amount of data contained in the portion of prior measurement data.

17. A computer-readable medium as recited in claim 15, wherein the one or more weighting criteria includes a ratio of an amount of data contained in the portion of prior measurement data to an amount of data contained in the new measurement data, and the step of determining the weighting factor upon the one or more weighting criteria includes determining the weighting factor based upon a ratio of an amount of data contained in the portion of prior measurement data to an amount of data contained in the new measurement data.

18. A computer-readable medium as recited in claim 17, wherein the set of measurement data selection criteria includes a confidence that a particular utterance was correctly recognized, and the step of selecting a portion of prior measurement data for a prior set of speech utterances based upon the set of measurement data selection criteria includes selecting a portion of prior measurement data for a prior set of speech utterances based upon the confidence that the particular utterance was correctly recognized.

19. A computer-readable medium as recited in claim 17, wherein the set of measurement data selection criteria includes whether a recognition result of a particular utterance was confirmed by a user, and the step of selecting a portion of prior measurement data for a prior set of speech utterances based upon the set of measurement data selection criteria includes selecting a portion of prior measurement data for a prior set of speech utterances based upon whether a recognition result of a particular utterance was confirmed by a user.

20. A computer-readable medium as recited in claim 15, wherein the one or more weighting criteria includes the subject matter of the new set of speech utterances, the step of determining the weighting factor based upon the one or more weighting criteria includes determining the weighting factor based upon the subject matter of the new set of speech utterances.

21. A method as recited in claim 14, wherein the set of measurement data selection criteria includes a confidence that a particular utterance was correctly recognized, and the step of selecting a portion of prior measurement data for a prior set of speech utterances based upon the set of measurement data selection criteria includes selecting a portion of prior measurement data for a prior set of speech utterances based upon the confidence that the particular utterance was correctly recognized.

22. A computer-readable medium as recited in claim 14, wherein the set of measurement data selection criteria includes whether a recognition result of a particular utterance was confirmed by a user, and the step of selecting a portion of prior measurement data for a prior set of speech utterances based upon the set of measurement data selection criteria includes selecting a portion of prior measurement data for a prior set of speech utterances based upon whether a recognition result of a particular utterance was confirmed by a user.

23. A telephone-based interactive speech recognition system comprising:

a storage medium; and a retraining mechanism communicatively coupled to the storage medium, wherein the retraining mechanism is configured to select a portion of prior measurement data for a prior set of speech utterances based upon a set of measurement data selection criteria, retrieve the portion of prior measurement data from the storage medium, determine new measurement data for a new set of speech utterances, apply a weighting factor to the new measurement data to generate weighted new measurement data, and generate new statistical model data for use by the telephone-based interactive speech recognition system, including using the portion of prior measurement data and the weighted new measurement data.

24. A telephone-based interactive speech recognition system as recited in claim 23, wherein the retraining mechanism is further configured to determine the weighting factor based upon on or more weighting criteria.

25. A telephone-based interactive speech recognition system as recited in claim 24, wherein the one or more weighting criteria includes an amount of data contained in the portion of prior measurement data, and the retraining mechanism is further configured to determine the weighting factor based upon the one or more weighting criteria includes determining the weighting factor based upon an amount of data contained in the portion of prior measurement data.

26. A telephone-based interactive speech recognition system as recited in claim 24, wherein the one or more weighting criteria includes a ratio of an amount of data contained in the portion of prior measurement data to an amount of data contained in the new measurement data, and the step of determining the weighting factor based upon the one or more weighting criteria includes determining the weighting factor based upon a ratio of an amount of data contained in the portion of prior measurement data to an amount of data contained in the new measurement data.

27. A telephone-based interactive speech recognition system as recited in claim 24, wherein the one or weighting criteria includes the subject matter of the new set of speech the step of determining the weighting factor based upon the one or more weighting criteria includes determining the weighting factor based upon the subject matter of the new set of speech utterances.

28. A telephone-based interactive speech recognition system as recited in claim 23, wherein the set of measurement data selection criteria includes a confidence that a particular utterance was correctly recognized, and the step of selecting a portion of prior measurement data for a prior set of speech utterances based upon the set of measurement data selection criteria includes selecting a portion of prior measurement data for a prior set of speech utterances based upon the confidence that the particular utterance was correctly recognized.

29. A telephone-based interactive speech recognition system as recited in claim 23, wherein the set to measurement data selection criteria includes whether a recognition result of a particular utterance was confirmed by a user, and the step of selecting a portion of prior measurement data for a prior set of speech utterances based upon the set of measurement data selection criteria includes selecting a portion of prior measurement data for a prior set of speech utterances based upon whether a recognition result of a particular utterance was confirmed by a user.

30. A method for automatically updating a statistical model for a speech recognition system comprising:

selecting a portion of prior measurement data for a prior set of speech utterances based upon a set of measurement data selection criteria;

retrieving the portion of prior measurement data;

determining new measurement data for a new set of speech utterances;

applying a weighting factor to the new measurement data to generate weighted new measurement data;

generating new statistical model data using the portion of prior measurement data and the weighted new measurement data; and using the new statistical model data to recognize speech utterances.

31. The method of claim 30 in which the measurement data selection criteria includes whether a recognition result of a particular utterance was confirmed by a user.

32. The method of claim 30 in which the measurement data selection criteria includes a confidence that a particular utterance was correctly recognized.

* * * * *